US012732237B2

(12) United States Patent
Venugopal et al.

(10) Patent No.: US 12,732,237 B2
(45) Date of Patent: Sep. 8, 2026

(54) TECHNIQUES FOR IDENTIFYING AN ANALOG PRECODER USED IN TRANSMITTING MULTI-PORT REFERENCE SIGNALS

(71) Applicant: QUALCOMM Incorporated, San Diego, CA (US)

(72) Inventors: Kiran Venugopal, Green Brook, NJ (US); Yu Zhang, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 342 days.

(21) Appl. No.: 18/482,713

(22) Filed: Oct. 6, 2023

(65) Prior Publication Data

US 2025/0119186 A1 Apr. 10, 2025

(51) Int. Cl.

*H04B 7/0456* (2017.01)
*H04B 7/06* (2006.01)
*H04L 5/00* (2006.01)

(52) U.S. Cl.

CPC ......... *H04B 7/0456* (2013.01); *H04B 7/0478* (2013.01); *H04B 7/0617* (2013.01); *H04L 5/0048* (2013.01)

(58) Field of Classification Search

CPC .. H04B 7/0456; H04B 7/0478; H04B 7/0617; H04L 5/0048

See application file for complete search history.

(56) References Cited

U.S. PATENT DOCUMENTS

| | | | | |
|---|---|---|---|---|
| 2016/0254893 | A1* | 9/2016 | Yang .................... | H04B 7/0619 370/329 |
| 2019/0158171 | A1* | 5/2019 | Ren ...................... | H04B 7/0456 |
| 2019/0305837 | A1* | 10/2019 | Onggosanusi ........ | H04W 24/10 |
| 2021/0050893 | A1* | 2/2021 | Park ...................... | H04L 5/0048 |
| 2021/0135716 | A1 | 5/2021 | Kuo et al. | |
| 2024/0275453 | A1* | 8/2024 | Ibrahim ............... | H04B 7/0617 |
| 2025/0055511 | A1* | 2/2025 | El Din ................. | H04B 7/0617 |

OTHER PUBLICATIONS

International Search Report and Written Opinion—PCT/US2024/045167—ISA/EPO—Jan. 7, 2025.

* cited by examiner

*Primary Examiner* — Michael A Keller
*Assistant Examiner* — Chhian (Amy) Ling
(74) *Attorney, Agent, or Firm* — Arent Fox Schiff, LLP

(57) ABSTRACT

Aspects described herein relate to transmitting, for a receiving node, a multi-port reference signal (RS) with no restriction on wideband digital precoding, and transmitting, for the receiving node, an indication of an analog precoder used for transmitting the multi-port RS. Other aspects relate to receiving the multi-port RS and indication of analog precoder.

30 Claims, 11 Drawing Sheets

TECHNIQUES FOR IDENTIFYING AN ANALOG PRECODER USED IN TRANSMITTING MULTI-PORT REFERENCE SIGNALS

FIELD OF THE DISCLOSURE

Aspects of the present disclosure relate generally to wireless communication systems, and more particularly, to techniques for transmitting multi-port reference signals.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to transmit, for a receiving node, a multi-port reference signal (RS) with no restriction on wideband digital precoding, and transmit, for the receiving node, an indication of an analog precoder used for transmitting the multi-port RS.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, from a transmitting node, a multi-port RS with no restriction on wideband digital precoding, and receive, from the transmitting node, an indication of an analog precoder used for transmitting the multi-port RS.

In another aspect, a method for wireless communication is provided that includes transmitting, for a receiving node, a multi-port RS with no restriction on wideband digital precoding, and transmitting, for the receiving node, an indication of an analog precoder used for transmitting the multi-port RS.

In another aspect, a method for wireless communication is provided that includes receiving, from a transmitting node, a multi-port RS with no restriction on wideband digital precoding, and receiving, from the transmitting node, an indication of an analog precoder used for transmitting the multi-port RS.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
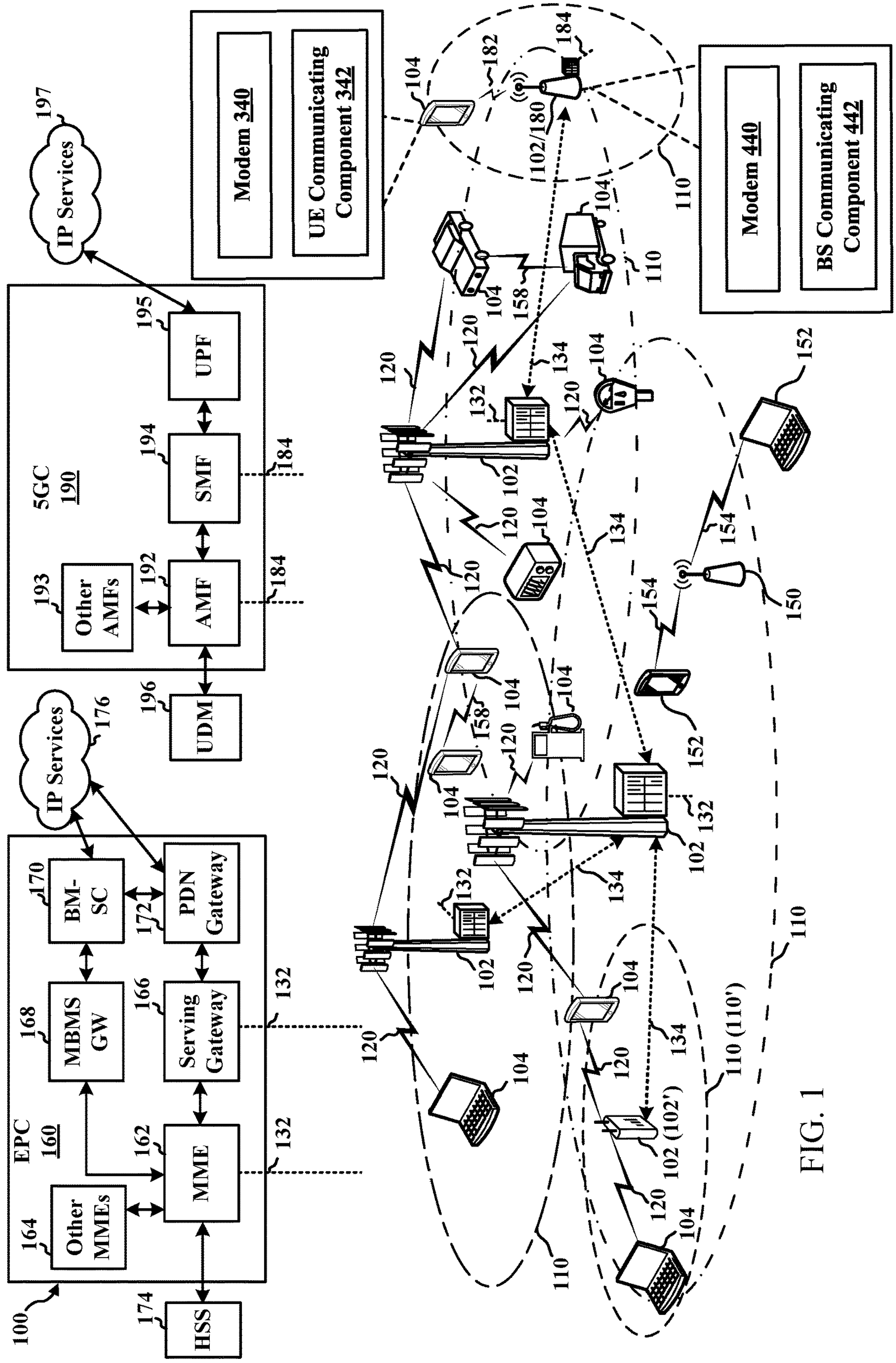
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to indicating an analog precoder used for transmitting a multi-port reference signal (RS) in wireless communications to allow for a multi-port RS with no restriction on wideband digital precoding. This can allow for selecting optimal multi-beam combinations that can be useful for higher rank multiple-input multiple-output (MIMO) operation. For example, a node, such as a user equipment (UE) or a network node in fifth generation (5G) new radio (NR) or other wireless communication technologies, can communicate using millimeter wave (mmWave) that leverages beamforming to counter pathloss and/or blockages, which can include finding an optimal transmit beam for a transmitting node and an optimal receive beam for a receiving node to use for communicating with one another. To enable MIMO operation, multiple beams can be determined at the transmitting node and the receiving node, where the multiple transmit and receive beams can be simultaneously used at the transmitting node and receiving node. The beams can be from the same or different antenna panels or subarrays (e.g., for multi-panel nodes) on the transmitting node or receiving node. In this regard, the beams, the associated RSs, corresponding data signals, etc. can be multi-port in that multiple antenna ports of a given transmitting node can be used to transmit the beams or associated RSs or data signals (and/or multiple antenna ports of a given receiving node can be used to receive the beams or associated RSs or data signals) using beamforming.

The effective MIMO channel that the nodes experience is based on the radio frequency (RF)/analog beamforming performed by the nodes, and the full channel is not known to the transmitting node or receiving node. Without the analog processing block, a link between the transmitting node and receiving node may not be established, and improper choice of the transmit and receive beam can alter the rank properties of the effective channel that is estimated. In such cases, the MIMO operation on the resulting digital system may not enhance the data rate. In addition, individually selected beam pairs (e.g., per panel) for each panel may not be jointly feasible or optimal. Currently, in 5G NR, for proper functionality, the transmission of analog beamformed reference signal uses a particular digital precoder structure for the mechanism (which can be based on beam management and CSI feedback). Aspects described herein relate to relaxing this requirement, and allowing the transmitting device to select its precoder, which can result in there being no restriction on the precoder (e.g., the wideband digital precoding).

In accordance with aspects described herein, the transmitting node can indicate the analog precoder used to transmit a multi-port RS to the receiving node. For example, the transmitting node can transmit an indication of a codebook index associated with selected antenna ports to the receiving node. In this example, the receiving node can be a UE that receives the multi-port RS, such as a channel state information-RS (CSI-RS) assuming no restriction on the wideband digital precoding, and can compute and/or report CSI using the indicated analog precoder. In another example, the receiving node can be a network node that receive the multi-port RS, such as a sounding reference signal (SRS) assuming no restriction on the wideband digital precoding, and can estimate uplink channel quality based on the indicated analog precoder.

Accordingly, using aspects described herein to indicate the analog precoder used in transmitting the multi-port RS can allow the transmitting node to transmit the multi-port RS without restriction on wideband digital precoding, and can allow the receiving node to accordingly decode or otherwise utilize the signal based on the analog precoder, which can result in more accurate decoding or processing of the RS for its intended purpose. This can improve CSI reporting, channel quality estimation, etc. in wireless communications, which can promote conserving radio resources, processing power, a more efficient spectrum usage, etc. In addition, this can allow network and/or device vendors to use (and specify) the precoder without necessarily limiting the precoder choice. This can allow for flexibility in signaling the information from the transmitting device to the receiving device, and the signaling precoder can be used for accurate and described feedback, in some examples.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms “system” and “network” may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named “3rd Generation Partnership Project” (3GPP). CDMA2000 and UMB are described in documents from an organization named “3rd Generation Partnership Project 2” (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for receiving or transmitting a multi-port RS and a corresponding indication of an analog precoder, in accordance with aspects described herein. In addition, some nodes may have a modem 440 and BS communicating component 442 for receiving or transmitting a multi-port RS and a corresponding indication of an analog precoder, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can transmit a multi-port RS to a base station 102 or another UE along with an indication of an analog precoder used to transmit the multi-port RS. In this example, BS communicating component 442 of a base station, or UE communicating component 342 of another UE, can receive the multi-port RS and process the RS based on the indicated analog precoder. In another example, BS communicating component 442 can transmit a multi-port RS to a UE 104 along with an indication of an analog precoder used to transmit the multi-port RS. In this example, UE communicating component 342 of a UE 104 can receive the multi-port RS and process the RS based on the indicated analog precoder. In any case, the indication of the analog precoder can allow the transmitting node to transmit the multi-port RS with no restriction on wideband digital precoding.

Figure 2:
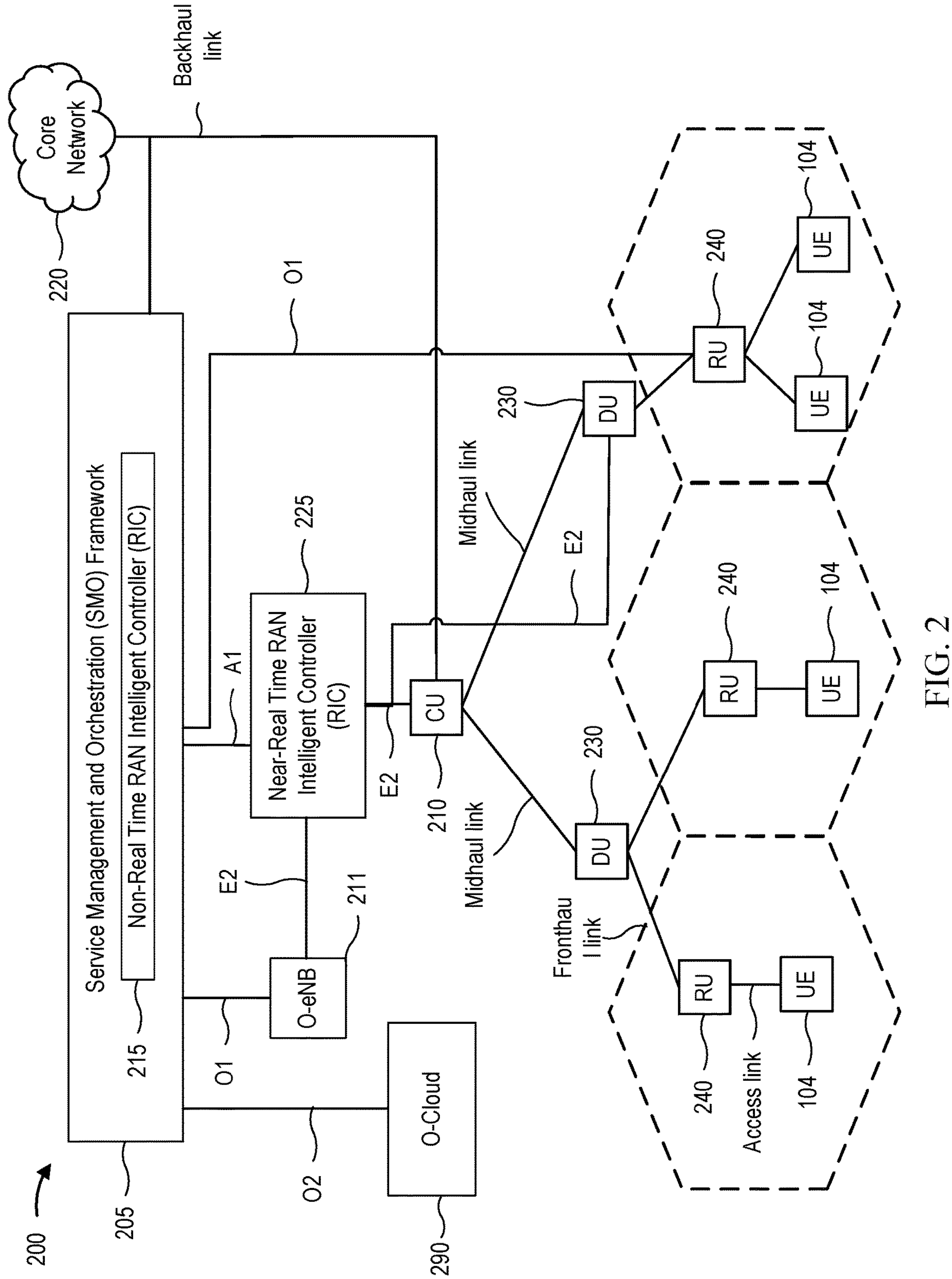
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 6:
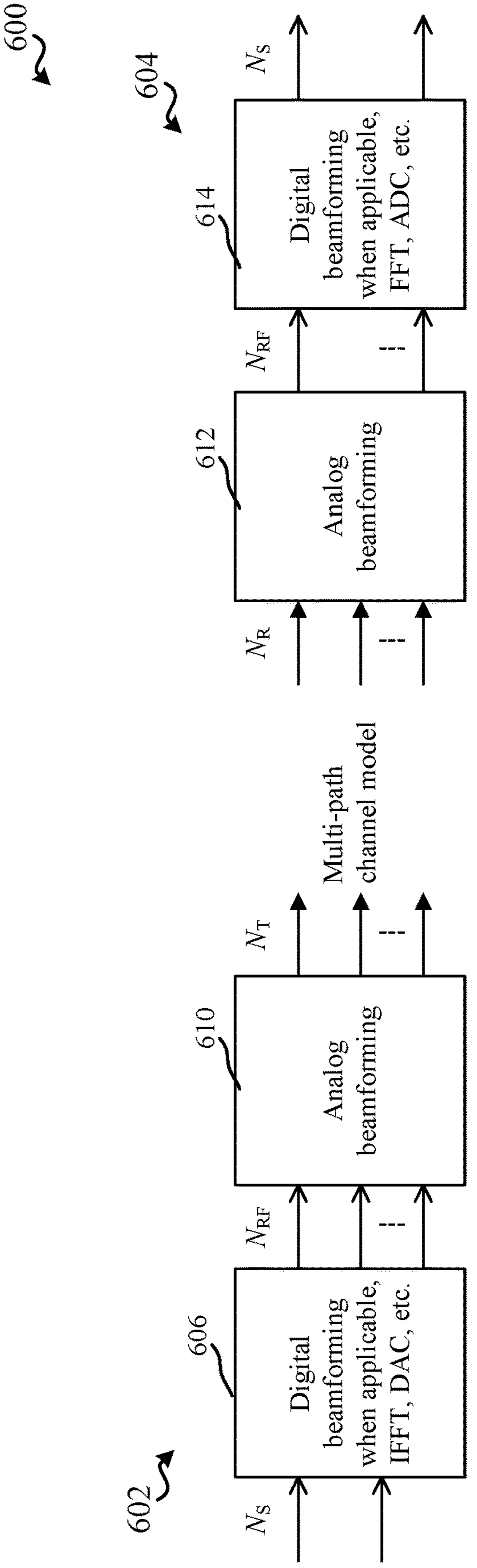
FIG. 6 illustrates an example of an extension of a MIMO communication system that supports transmission and/or reception of signals using multiple antenna ports, in accordance with aspects described herein.
Figure 7:
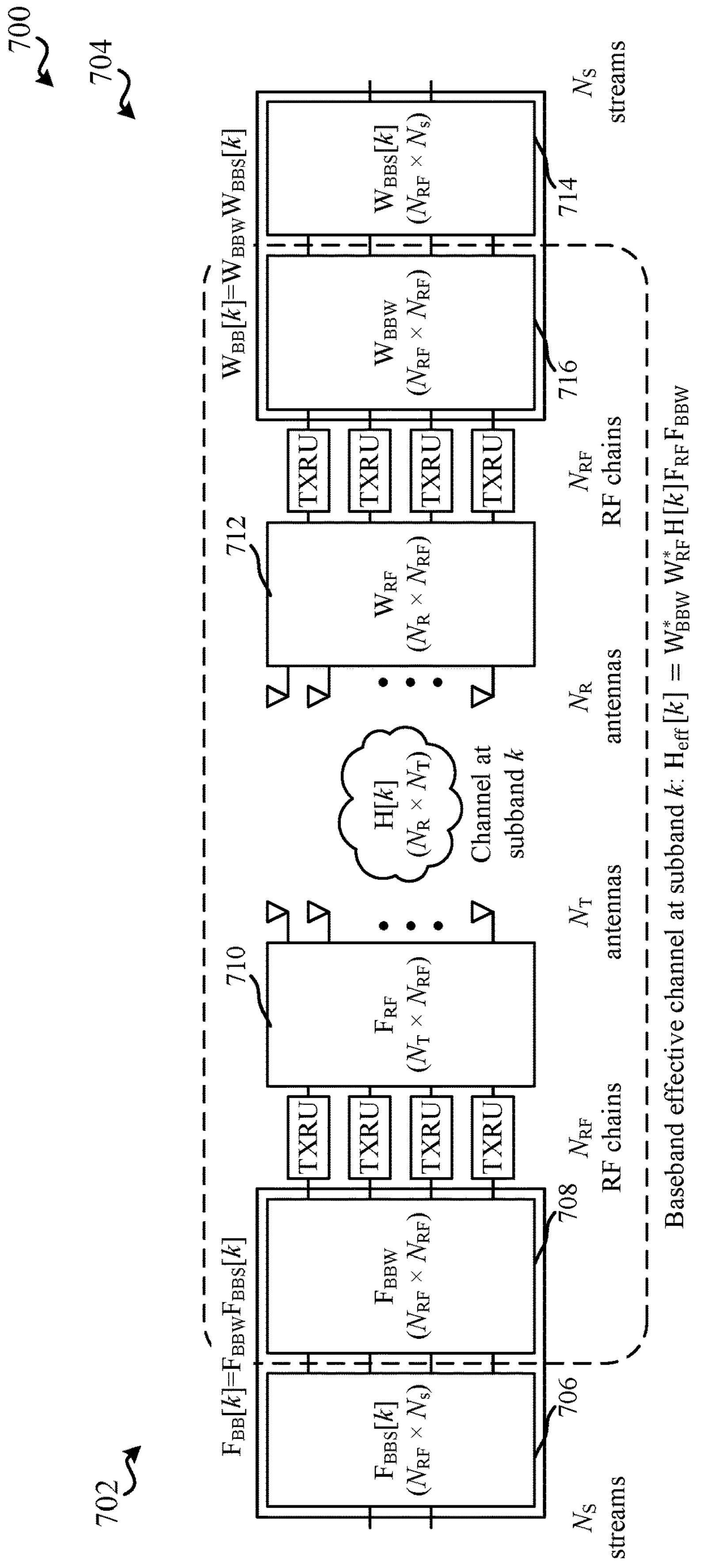
FIG. 7 illustrates an example of a MIMO communication system that supports transmission and/or reception of signals using multiple antenna ports along with associated terms defined herein.
Figure 8:
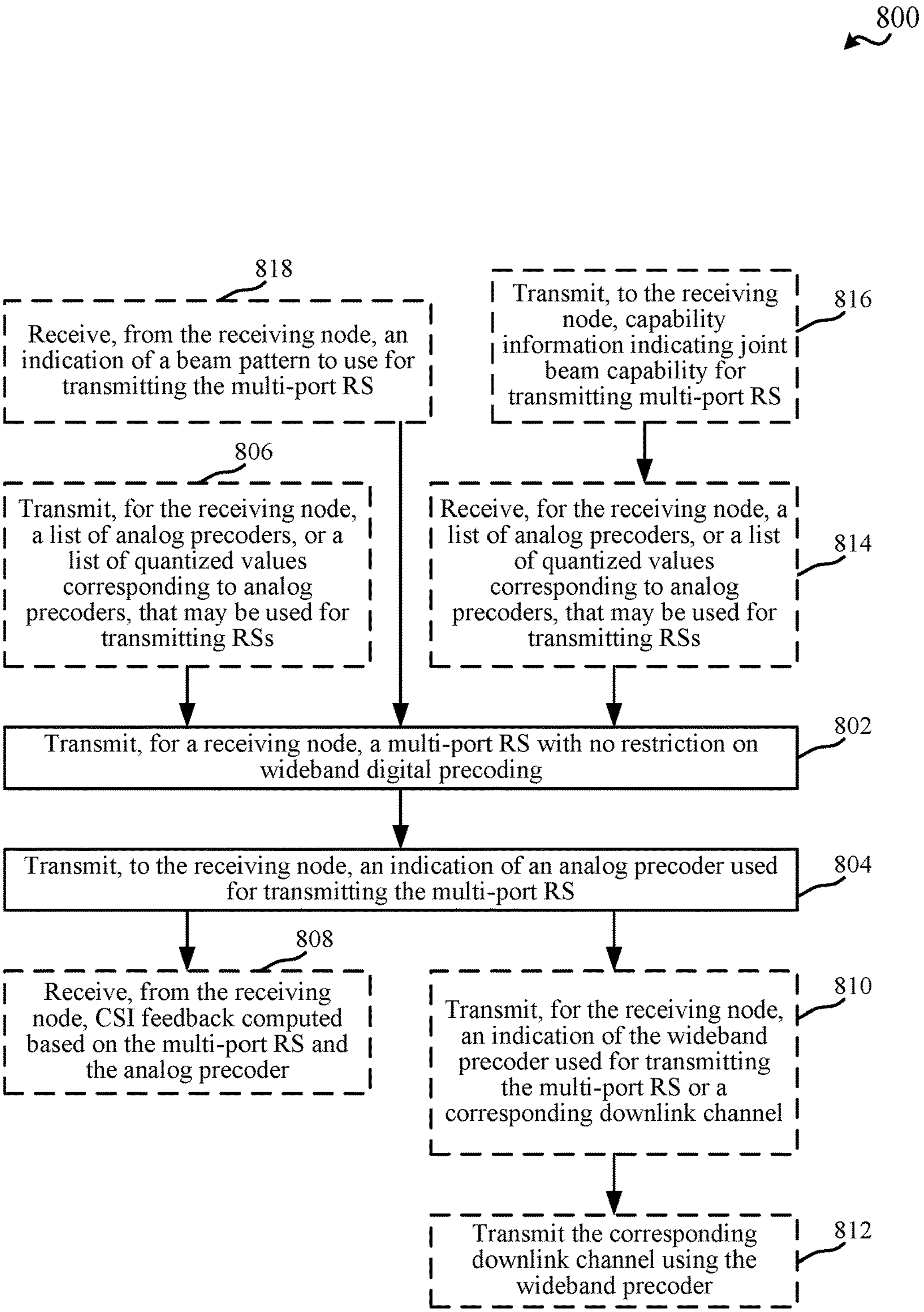
FIG. 8 is a flow chart illustrating an example of a method for transmitting a multi-port RS and an indication of an associated analog precoder, in accordance with aspects described herein.
Figure 9:
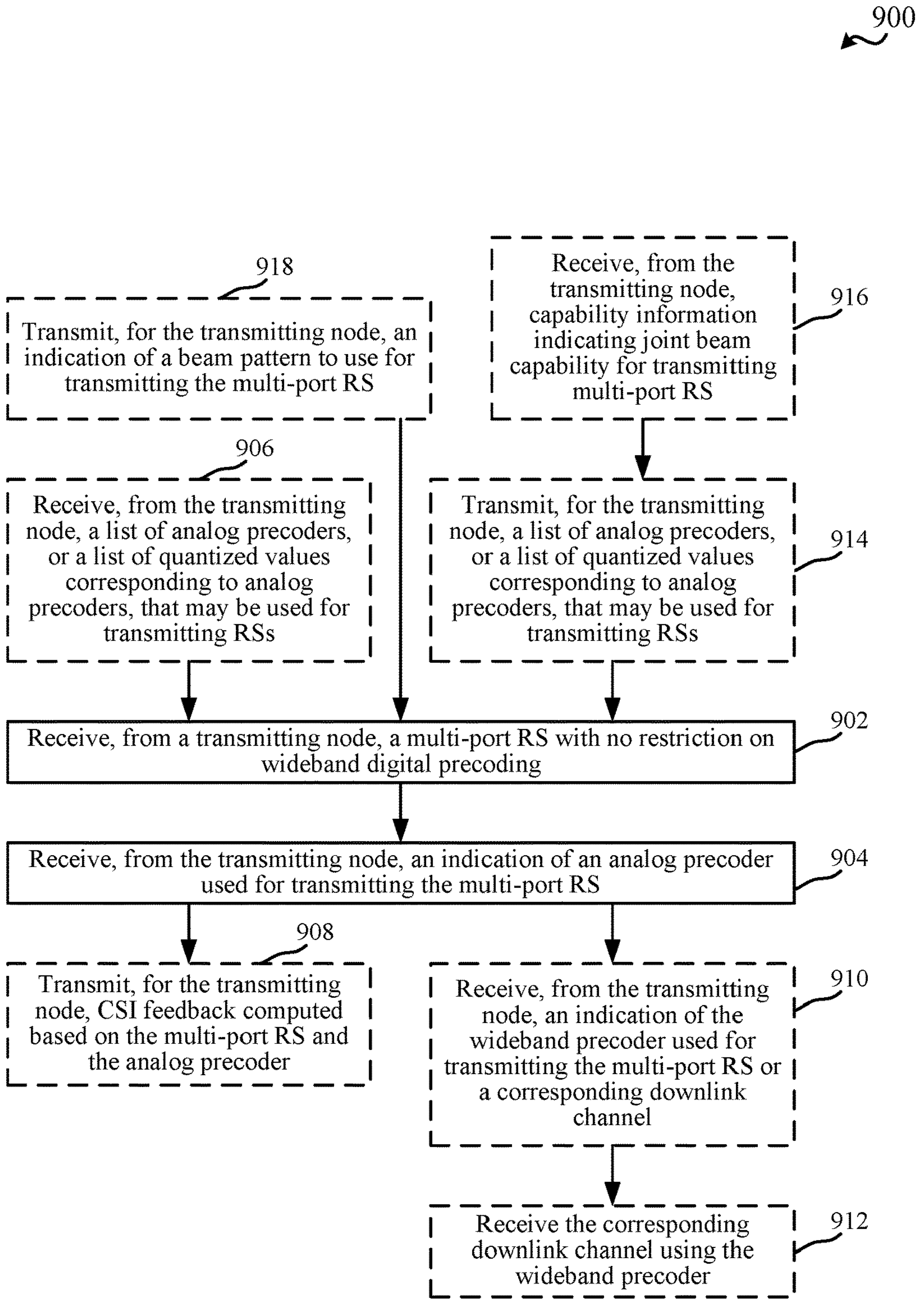
FIG. 9 is a flow chart illustrating an example of a method for receiving a multi-port RS and an indication of an associated analog precoder, in accordance with aspects described herein.

Turning now to FIGS. 3-11, aspects are depicted with reference to one or more components and one or more methods that may perform the actions or operations described herein, where aspects in dashed line may be optional. Although the operations described below in FIGS. 8 and 9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
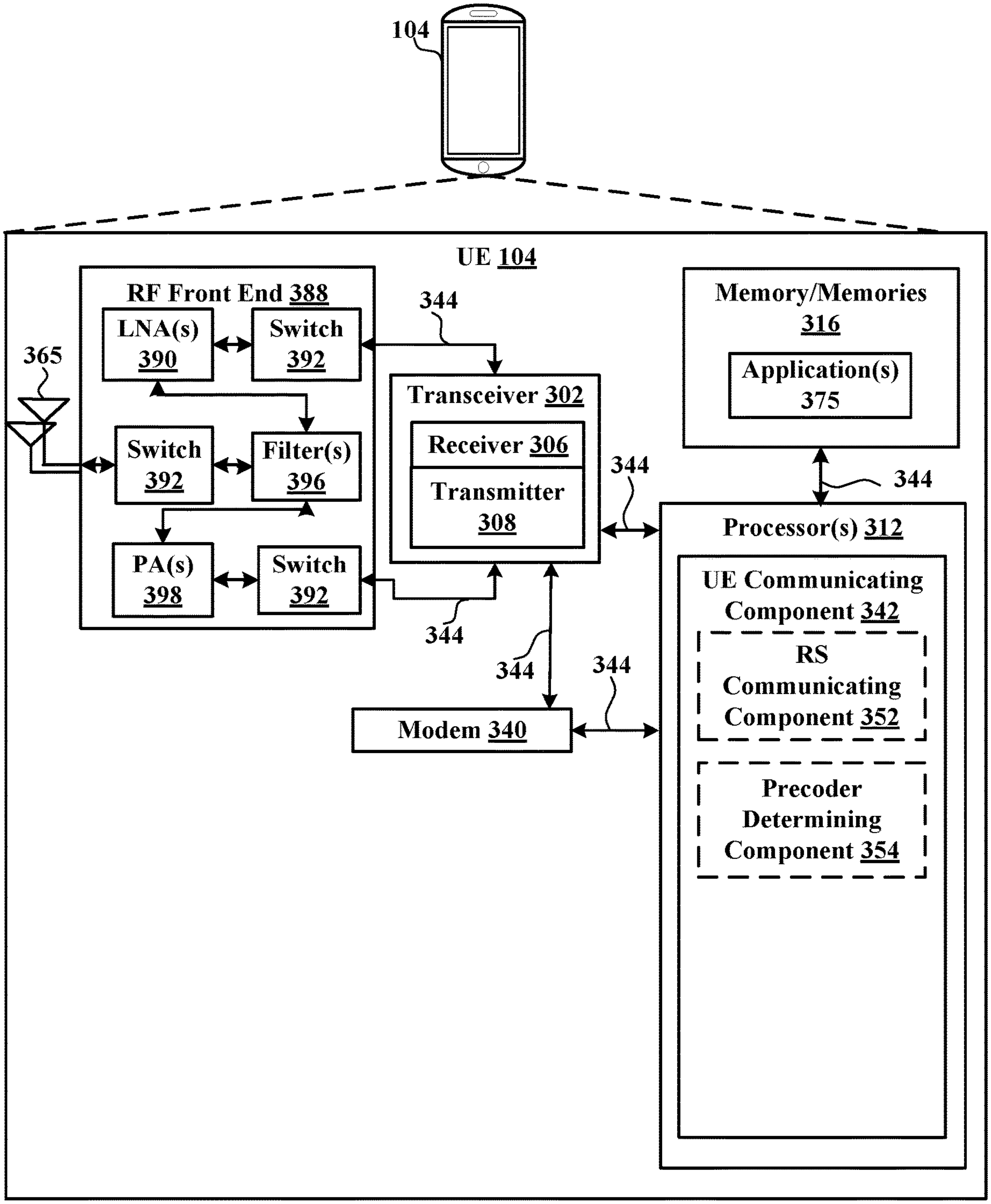
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for receiving or transmitting a multi-port RS and a corresponding indication of an analog precoder, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include an RS communicating component 352 for transmitting or receiving a multi-port RS, and/or a precoder determining component 354 for indicating or receiving an indication of an analog precoder used in transmitting the multi-port RS.

In an aspect, the processor(s) 312 may correspond to one or more of the processors described in connection with the UE in FIG. 11. Similarly, the memory/memories 316 may correspond to the one or more memories described in connection with the UE in FIG. 11.

Figure 4:
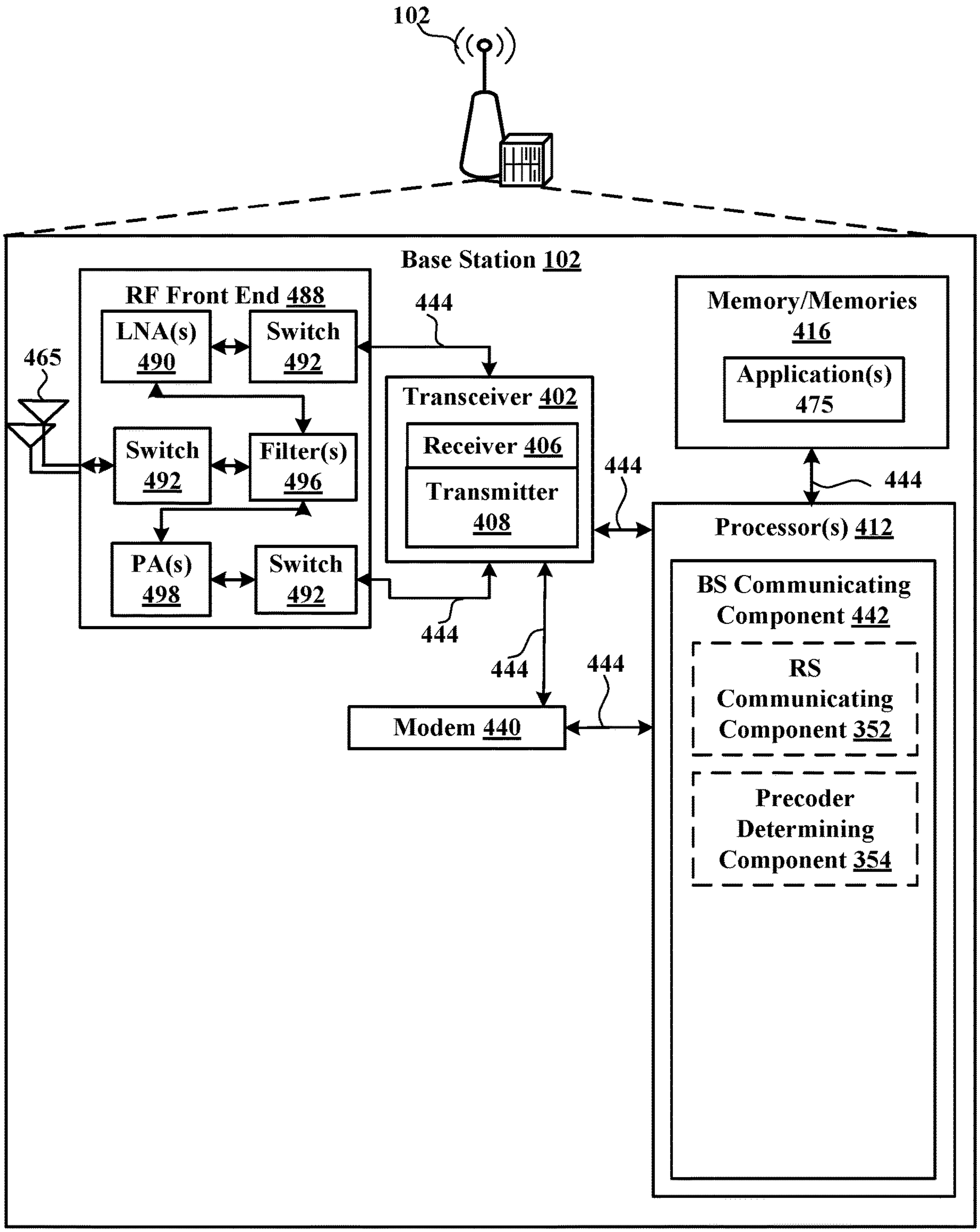
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and/or BS communicating component 442 for receiving or transmitting a multi-port RS and a corresponding indication of an analog precoder, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include an RS communicating component 352 for transmitting or receiving a multi-port RS, and/or a precoder determining component 354 for indicating or receiving an indication of an analog precoder used in transmitting the multi-port RS.

In an aspect, the processor(s) 412 may correspond to one or more of the processors described in connection with the base station in FIG. 11. Similarly, the memory/memories 416 may correspond to the one or more memories described in connection with the base station in FIG. 11.

Figure 5:
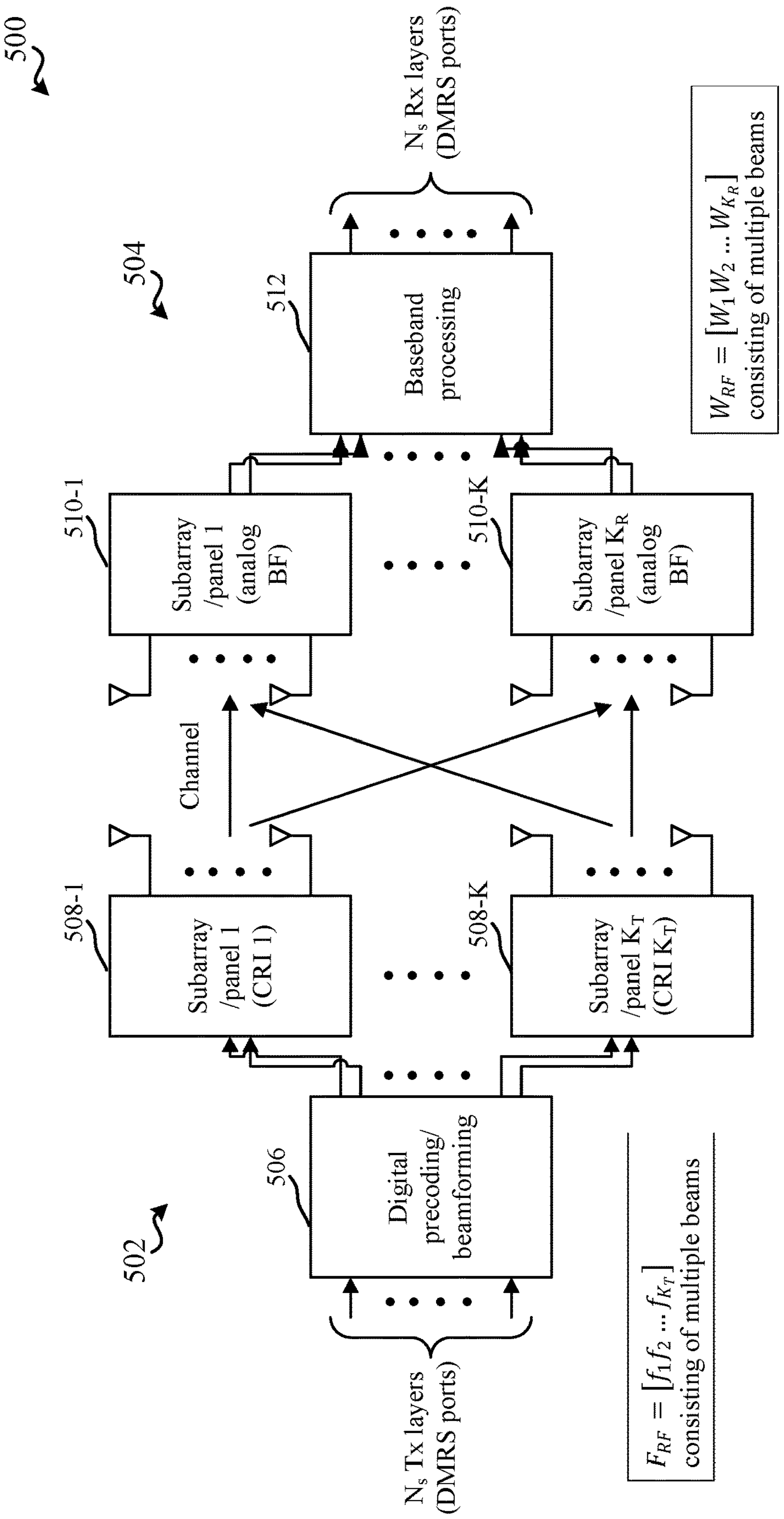
FIG. 5 illustrates an example of a multiple-input multiple-output (MIMO) communication system that supports transmission and/or reception of signals using multiple antenna ports, in accordance with aspects described herein.

FIG. 5 illustrates an example of a MIMO communication system 500 that supports transmission and/or reception of signals using multiple antenna ports. System 500 includes RF components 502 of a transmitting node that can be used to transmit signals via multiple antennas, and RF components 504 of a receiving node that can be used to receive the signals via multiple antennas. RF components 502 of the transmitting node can include digital precoding/beamforming 506 that can receive signals from multiple ($N_S$) transmit (Tx) antenna layers, also referred to as demodulation reference signal (DMRS) ports, and can perform digital precoding and/or beamforming to generate beamformed signals for transmitting via at least a portion of multiple subarray/antenna panels 508-1, . . . , 508-K, which can each transmit using one or more associated physical antennas. RF components 504 of the receiving node can receive signals from the transmitting node using each of one or more physical antennas of multiple subarray/antenna panels 510-1, . . . , 510-K. The signals received via the multiple subarray/antenna panels 510-1, . . . , 510-K can be provided to baseband processing 512 to obtain signals corresponding to multiple ($N_S$) receive (Rx) antenna layers. The transmit beam $F_{RF}=[f_1\ f_2\ \ldots\ f_{K_T}]$ including multiple beams, and the receive beam $W_{RF}=[w_1\ w_2\ \ldots\ w_{K_R}]$ including multiple beams. In an example, $F_{RF}$ can correspond to the beam at a network node regardless of whether the network node is transmitting or receiving the RS, and $W_{RF}$ can correspond to the beam at a UE regardless of whether the UE is receiving or transmitting the RS. Improper choice of $F_{RF}$ and/or $W_{RF}$ can alter the rank properties of the effective channel that is estimated, and MIMO operation on this resulting digital system may not enhance the data rate, as explained above.

FIG. 6 illustrates an example of an extension of a MIMO communication system 600 that supports transmission and/or reception of signals using multiple antenna ports. System 600 includes RF components 502 of a network node that can be used to transmit signals from multiple MIMO streams ($N_S$) via multiple transmit antennas ($N_T$), and RF components 504 of a UE that can be used to receive the signals via multiple receive antennas ($N_R$) to generating multiple MIMO streams ($N_S$). RF components 602 of the network node can include digital beamforming 606, which can be used to receive MIMO streams $N_S$ and beamform the MIMO streams for RF chains ($N_{RF}$) for analog beamforming 610, which can apply analog beamforming and transmit signals over multiple transmit antennas ($N_T$), as described above. RF components 604 of the UE can receive signals from the network node (multi-path channel model) using each of multiple receive antennas ($N_R$). RF components 604 can include analog beamforming 612 for receiving the analog signals and generating RF chains ($N_{RF}$) for providing to digital beamforming 614 to generate the MIMO streams $N_S$. Digital beamforming 606 can perform inverse fast Fourier transform (IFFT), digital-to-analog conversion (DAC), etc. to the RF chains to generate signals for analog beamforming 610. Digital beamforming 614 can perform fast Fourier transform (FFT), analog-to-digital conversion (ADC), etc. to received analog signals from analog beamforming 612 to generate the RF chains. Though shown and described as the network node transmitting RS to the UE, it some examples, the UE can transmit RS to the network node using the components as described (e.g., RF components 604 can also have functionality similar to RF components 602, and/or RF components 602 can also have functionality similar to RF components 604, as described herein).

In FIG. 6 and throughout this description, the number of RF chains available for MIMO operation $N_{RF} \leq \min(N_T, N_R)$, the number of MIMO streams $N_S \leq N_{RF}$. The analog precoder of the network node can be represented as $F_{RF} \in \mathbb{C}^{N_T \times N_{RF}}$, where each column $$f_{RF} \in \mathcal{F}^{v}_{RF},$$

the analog dictionary or codebook at the transmitting node. The analog precoder of the UE can be represented as $W_{RF} \in \mathbb{C}^{N_R \times N_{RF}}$, where each column $$w_{RF} \in \mathcal{W}^{v}_{RF},$$

the analog dictionary or codebook at the receiving node. The baseband precoder at the network node can be represented as $F_{BB}[k] \in \mathbb{C}^{N_{RF} \times N_S}$, and baseband precoder at the UE can be represented as $W_{BB}[k] \in \mathbb{C}^{N_{RF} \times N_S}$. The effective precoder at the network node can be represented as $F_T[k] = F_{RF} F_{BB}[k]$, and effective precoder at the UE can be represented as $W_R[k] = W_{RF} W_{BB}[k]$. In this example, the baseband received signal vector at subband k can be represented as:

$$y[k] = W^*_{BB}[k] W^*_{RF} H[k] F_{RF} F_{BB}[k] s[k] + W^*_{BB}[k] W^*_{RF} n[k] \quad \text{for } k = 1, \ldots, N_{SB}$$

where $$W^*_{BB}[k]$$

and $F_{BB}[k]$ are subband baseband beamformers (e.g., dependent on subband index, k), s[k] is the signal at subband k, and n[k] is the noise at subband k. It can be desirable to maximize the achievable rate (e.g., mutual information (MI)) for the given codebooks used for precoding the signals:

$$MI = \max_{\substack{F_{RF}, W_{RF} \\ F_{BB}[1], \ldots, F_{BB}[N_{SB}] \\ W_{BB}[1], \ldots, W_{BB}[N_{SB}]}} \sum_{k=1}^{N_{SB}} \log_2 \left| I_{N_S} + \frac{SNR}{N_S} \hat{H}[k] \hat{H}^*[k] \right|$$

where $$\hat{H}[k] = W^*_{BB}[k] W^*_{RF} H[k] F_{RF} F_{BB}[k]$$

such that $$F_{RF} \in \mathcal{F}^{v}_{RF},$$

the analog dictionary or codebook for $F_{RF}$, and $$W_{RF} \in \mathcal{W}^{v}_{RF},$$

the analog dictionary or codebook for $W_{RF}$. An example is shown in FIG. 7.

FIG. 7 illustrates an example of a MIMO communication system 700 that supports transmission and/or reception of signals using multiple antenna ports along with associated terms defined herein. System 700 includes RF components 702 of a network node that can be used to transmit signals via multiple antennas, and RF components 704 of a UE that can be used to receive the signals via multiple antennas. RF components 702 can include a subband digital precoder 706 that receives $N_S$ MIMO streams and applies a subband precoder $F_{BBS}[k](N_{RF} \times N_S)$ to generate precoded signals in the subband domain, a wideband digital precoder 708 that precodes the subband precoded signals into wideband precoded signals using a wideband digital precoder $F_{BBW}(N_{RF} \times N_{RF})$, and an analog beamformer 710 that applies the analog beamformer $F_{RF}$ $(N_T \times N_{RF})$, also referred to herein as the analog precoder, to the precoded signals, or RF chains $N_{RF}$, for transmission as channel $H[k](N_R \times N_T)$. RF components 704 can include an analog beamformer 712 that applies the analog beamformer $W_{RF}$ $(N_R \times N_{RF})$, also referred to herein as the analog combiner, to the channel H[k] as received to obtain precoded signals, or RF chains $N_{RF}$, a wideband digital precoder 714 that applies the wideband digital precoder $W_{BBW}$ $(N_{RF} \times N_{RF})$ to decode the precoded signals, and a subband digital precoder 716 that applies the subband digital precoder $W_{BBS}[k](N_{RF} \times N_S)$ to obtain the $N_S$ MIMO streams. Though shown and described as the network node transmitting RS to the UE, it some examples, the UE can transmit RS to the network node using the components as described (e.g., RF components 704 can also have functionality similar to RF components 702, and/or RF components 702 can also have functionality similar to RF components 704, as described herein).

In an example, if $F_{RF}$ and $W_{RF}$ are known, $F_{BBW}$ and $W_{BBW}$ can be determined as respectively depending on $F_{RF}$ and $W_{RF}$. For example:

$$F_{BBW} = (F^*_{RF} F_{RF})^{-\frac{1}{2}} \text{ and } W_{BBW} = (W^*_{RF} W_{RF})^{-\frac{1}{2}}$$

In addition, if $F_{RF}$ and $W_{RF}$ are known, $F_{BBS}[k]$ and $W_{BBS}[k]$ can depend on the baseband effective channel, $H_{eff}[k]$, where:

$$H_{eff}[k]=W^*_{BBW}W^*_{RF}H[k]F_{RF}F_{BBW}.$$

$F_{BBS}[k]$ and $W_{BBS}[k]$ can be matrices composed of the dominant $N_S$ right and left singular vectors of $H_{eff}[k]$. Without knowing the analog precoder $F_{RF}$ used to transmit a multi-port RS, restrictions may be required on the wideband digital precoder used by the network node. For example, $F_{BBW}$=I (and/or $W_{BBW}$=I), where I is an identity matrix, may not be an optimal precoder in this case. Aspects described herein relate to indicating the analog precoder $F_{RF}$ used to transmit a multi-port RS, which can allow for relaxing restriction on wideband digital precoding.

FIG. 8 illustrates a flow chart of an example of a method 800 for transmitting a multi-port RS and an indication of an associated analog precoder, in accordance with aspects described herein. FIG. 9 illustrates a flow chart of an example of a method 900 for receiving a multi-port RS and an indication of an associated analog precoder, in accordance with aspects described herein. In an example, a UE 104 or a network node (e.g., a base station 102 or gNB 180, a monolithic base station or gNB, a portion of a disaggregated base station or gNB, etc.) can perform the functions described in method 800 shown in FIG. 8 using one or more of the components described in FIGS. 1, 3, and/or 4. In an example, another one of a UE 104 or a network node can perform the functions described in method 900 shown in FIG. 9 using one or more of the components described in FIGS. 1, 3, and/or 4. Methods 800 and 900 are described in conjunction with one another for ease of explanation; however, the methods 800 and 900 are not required to be performed together and indeed can be performed independently using separate devices.

In method 800, at Block 802, a multi-port RS can be transmitted for a receiving node with no restriction on wideband digital precoding. In an aspect, RS communicating component 352 of a transmitting node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can transmit, for the receiving node, the multi-port RS with no restriction on wideband digital precoding. For example, the transmitting node can be a UE transmitting the multi-port RS (e.g., SRS) to a network node (or another UE in sidelink communications). In another example, the transmitting node can be a network node transmitting the multi-port RS (e.g., CSI-RS) to a UE. For example, the multi-port RS can be transmitted using a wideband digital precoder, an analog beamformer/precoder, etc., as described above. As described, some wireless communication technologies, such as 5G NR, may currently limit a transmitting node to using one or a specific set of precoders (e.g., for wideband digital precoding). This may not be desirable. As such, RS communicating component 352 or 452 can transmit the multi-port RS without restriction on the wideband digital precoding (e.g., without having to receive or use one or more of a specific set of precoders) and can select substantially any precoder, in accordance with aspects described herein. Thus, for example, where the wireless communication technology specifies or requires use of a specific precoder, RS communicating component 352 or 452 can ignore the requirement or otherwise select a different precoder than those specified and/or configured at the transmitting node using the aspects described herein.

In method 800, at Block 804, an indication of an analog precoder used for transmitting the multi-port RS can be transmitted to the receiving node. In an aspect, precoder determining component 354 of a transmitting node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can transmit, to the receiving node, the indication of the analog precoder used for transmitting the multi-port RS. As described, for example, receiving node can use the indication of the analog precoder to determine the wideband digital precoder and/or subband digital precoder used by the transmitting node to precode the RS, and the receiving node can accordingly process the RS based on the determined precoder(s).

In an example, precoder determining component 354 can transmit the indication using one or more of semi-static signaling, such as radio resource control (RRC) signaling, dynamic signaling, such as media access control (MAC)-control element (CE), control information (e.g., downlink control information (DCI) for network as transmitting node or uplink control information (UCI) for UE as transmitting node), etc. In an example, the indication can be an index into a codebook associated with a selected beam pattern for transmitting and/or receiving the multi-port RS, where the codebook can be configured using semi-static signaling, stored in a memory 316 or 416 of the corresponding node, etc. In an example, precoder determining component 354 can transmit the indication via RRC in a CSI-Resource configuration information element (IE) or SRS configuration IE. For example, resource A configuration defined in 5G NR can have an associated codebook index field in the RRC IE that identifies an index of the codebook associated with the analog precoder. In another example, an SSB resource and/or RS that may be used as a quasi-colocation (QCL) source RS for transmission configuration indicator (TCI) indication for an analog precoder can be configured with codebook index field in RRC. In an example, precoder determining component 354 can configure a list of analog precoders that can be used, and each analog precoder in the list can also indicate or be associated with SSB resources that are QCL with the multi-port RS. In any case, precoder determining component 354 can set the codebook index field to indicate the analog precoder used to transmit the multi-port RS.

In another example, a resource identifier can be dynamically associated with different ports or beams (e.g., analog precoder), which can be configured by the network node for the UE. In an example, precoder determining component 354 can indicate the association for a utilized resource via MAC-CE or in DCI triggering the multi-port RS (e.g., the CSI-RS transmission by the network node or the SRS transmission by the UE) or the CSI report to indicate the analog precoder. For example, for a CSI-RS, a new source QCL can be dynamically indicated or updated, based on which the associated codebook index may also be implicitly indicated or updated. In another example, each resource may have a subset of associated codebook index fields that can be configured in the RRC IE and precoder determining component 354 can enable at least one in the initial configuration. Using MAC-CE or DCI, precoder determining component 354 can enable or indicate a different index field from the previously configured list/subset.

In method 900, at Block 902, a multi-port RS can be received from a transmitting node with no restriction on wideband digital precoding. In an aspect, RS communicating component 352 of a receiving node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can receive, from the transmitting node, the multi-port RS with no restriction on wideband digital precoding. For example, the receiving node can be a UE receiving the multi-port RS (e.g., CSI-RS) from a network node. In another example, the transmitting node can be a network node or UE in sidelink communication receiving the multi-port RS (e.g., SRS) from a UE. For example, the multi-port RS can be received and processed using a wideband digital precoder, an analog beamformer/precoder, etc., as described above.

In method 900, at Block 904, an indication of an analog precoder used for transmitting the multi-port RS can be received from the transmitting node. In an aspect, precoder determining component 354 of a receiving node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can receive, from the transmitting node, the indication of the analog precoder used for transmitting the multi-port RS. As described, for example, the UE or network node receiving the indication of the analog precoder can use the indication of the analog precoder to determine the wideband digital precoder and/or subband digital precoder used by the transmitting node to precode the RS. The UE or network node receiving the RS and the indication can accordingly process the RS based on the determined precoder(s).

For example, where the transmitting node is a network node transmitting a multi-port CSI-RS with no restriction on wideband digital precoding (e.g., $F_{BBW}=I$), the analog precoder may be determined by the network node, which may be based on a reference analog precoder codebook dictionary configured at the receiving node (e.g., UE). In an example, as described further herein, the transmitting node (e.g., network node) can configure the codebook for the receiving node (e.g., UE). For example, the codebook may include an oversampled discrete Fourier transform (DFT) codebook with parameters $N_1$-$N_2$, which may be associated with azimuth and elevation dimension, oversampling factors $O_1$-$O_2$, a combination thereof, etc., which may be as defined in 3GPP technical specification (TS) 38.214, e.g., in Table 5.2.2.2.1-2. In this example, precoder determining component 354 can indicate the analog precoder in terms of the indices in the oversampled DFT codebook ($s_1$, $s_2$), where $s_i \in 0, 1, 2, \ldots, N_iO_i$. In another example, the codebook may be preconfigured (e.g., site-specific, vendor-specific, carrier-specific, network/UE node capability specific) and exchanged between nodes during initial signaling. In an example, instead of the exact values (e.g., complex entries of the codebook) some quantized values may be specified in the codebook or as a representation of the codebook, so that proprietary advantage is retained. In this example, precoder determining component 354 can indicate the analog precoder in terms of the indices of the codebook that may include quantized values. The receiving node can know how to translate the quantized values into the actual precoder.

In the above examples, the indication can point to an index in the codebook dictionary. For example, method 800 can optionally include, at Block 806, transmitting, for the receiving node, a list of analog precoders, or a list of quantized values corresponding to analog precoders, that may be used for transmitting RSs. In an aspect, precoder determining component 354 of a transmitting node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can transmit, for the receiving node, the list of analog precoders, or the list of quantized values corresponding to analog precoders, that may be used for transmitting RSs. As described, for example, precoder determining component 354 can transmit the list using RRC signaling, as a pre-configuration during initial signaling, etc. In this example, precoder determining component 354 can then indicate the analog precoder as an index into the configured list of precoders or quantized values.

In another example, method 900 can optionally include, at Block 906, receiving, from the transmitting node, a list of analog precoders, or a list of quantized values corresponding to analog precoders, that may be used for transmitting RSs. In an aspect, precoder determining component 354 of a receiving node, e.g., in conjunction with processor(s) 312, memory/memories 316, transceiver 302, UE communicating component 342, etc. or in conjunction with processor(s) 412, memory/memories 416, transceiver 402, BS communicating component 442, etc., can receive, from the transmitting node, the list of analog precoders, or the list of quantized values corresponding to analog precoders, that may be used for transmitting RSs. In this example, precoder determining component 354 can receive the indication of the analog precoder as an index into the list of analog precoders or quantized values, and can determine the analog precoder as the precoder indicated by the configuration at the index.

Where the multi-port RS is a CSI-RS transmitted by a network node and received by a UE, for example, the UE, as receiving node, can process and transmit CSI to the network node based on the CSI-RS. For example, method 900 can optionally include, at Block 908, transmitting, for the transmitting node, CSI feedback computed based on the multi-port RS and the analog precoder. In an aspect, UE communicating component 342 of the UE 104 as a receiving node, e.g., in conjunction with processor(s) 312, memory/memories 316, transceiver 302, etc. can transmit, for the transmitting node (e.g., network node), CSI feedback computed based on the multi-port RS and the analog precoder received from the transmitting node. For example, RS communicating component 352 of the UE 104 can receive the multi-port CSI-RS resource assuming no restriction on the wideband digital precoding (e.g., $F_{BBW}=I$), and UE communicating component 342 can compute CSI using the indicated index associated with the analog precoder. For example, where $$W_{RF,q}^{*}H[k]F_{RF,p}$$

is the received effective channel estimate, which is post processed at the receiving node UE using the indicated index to derive $$F_{BBW} = \left(F_{RF,p}^{*}F_{RF,p}\right)^{-1/2}$$

and the effective CSI feedback can be based on the singular value decomposition (SVD) of the so computed $$W_{BBW}^{*} W_{RF}^{*} H[k] F_{RF} F_{BBW}$$

(with pre-configured iterations over p and q).

In an example, method 800 can optionally include, at Block 808, receiving, from the receiving node, CSI feedback computed based on the multi-port RS and the analog precoder. In an aspect, BS communicating component 442 of the network node as a transmitting node, e.g., in conjunction with processor(s) 412, memory/memories 416, transceiver 402, etc. can receive, from the receiving node (e.g., UE), CSI feedback computed based on the multi-port RS and the analog precoder received from the transmitting node. In this example, BS communicating component 442 can process the CSI feedback and/or can determine an associated precoder or other transmission parameters to use for transmitting corresponding downlink signals or subsequent RSs to the UE.

In another example, the network node may (e.g., based on implementation) use a wideband digital precoder $F_{BBW} \neq I$, in which case the network node may or may not indicate a corresponding choice in addition to the analog precoder. For example, the choice of wideband digital precoder may change between transmission of the CSI-RS and transmission of data (e.g., physical downlink shared channel (PDSCH)), in which case precoder determining component 354 of the network node can transmit the indication of the wideband digital precoder (e.g., based on a configured digital precoder dictionary). In an example, method 800 can optionally include, at Block 810, transmitting, for the receiving node, an indication of the wideband precoder used for transmitting the multi-port RS or a corresponding downlink channel. In an aspect, precoder determining component 354 of the network node as a transmitting node, e.g., in conjunction with processor(s) 412, memory/memories 416, transceiver 402, BS communicating component 442, etc. can transmit, for the receiving node, the indication of the wideband precoder used for transmitting the multi-port RS or the corresponding downlink channel. For example, precoder determining component 354 can transmit the indication of the wideband precoder as an index into a configured digital precoder dictionary, and may transmit the indication using MAC-CE, DCI, or other signaling.

In an example, method 900 can optionally include, at Block 910, receiving, from the transmitting node, an indication of the wideband precoder used for transmitting the multi-port RS or a corresponding downlink channel. In an aspect, precoder determining component 354 of the UE as a receiving node, e.g., in conjunction with processor(s) 312, memory/memories 316, transceiver 302, UE communicating component 342, etc. can receive, from the transmitting node, the indication of the wideband precoder used for transmitting the multi-port RS or the corresponding downlink channel. For example, precoder determining component 354 can receive the indication of the wideband precoder as an index into a configured digital precoder dictionary (e.g., in MAC-CE, DCI, or other signaling). Precoder determining component 354 can accordingly determine the wideband digital precoder corresponding to the index, and UE communicating component 342 may compensate for the precoder effect of the precoder before computing CSI feedback or processing PDSCH (e.g., by using a pseudo-inverse of the wideband digital precoder). In another example, where the network node does not indicate the wideband digital precoder, UE communicating component 342 can compute CSI or process PDSCH using the same wideband digital precoder, which may be based on an implicit rule or defined as a default behavior where an indication of the wideband digital precoder is not received.

In an example, method 800 can optionally include, at Block 812, transmitting the corresponding downlink channel using the wideband precoder. In an aspect, BS communicating component 442 of the network node as a transmitting node, e.g., in conjunction with processor(s) 412, memory/memories 416, transceiver 402, etc. can transmit the corresponding downlink channel (e.g., PDSCH) using the wideband precoder as indicated in Block 810 or implicitly as the wideband precoder used for transmitting the multi-port RS. In an example, method 900 can optionally include, at Block 912, receiving the corresponding downlink channel using the wideband precoder. In an aspect, UE communicating component 342 of the UE as a receiving node, e.g., in conjunction with processor(s) 312, memory/memories 316, transceiver 302, etc. can receive the corresponding downlink channel (e.g., PDSCH) using the wideband precoder as indicated in Block 910 or implicitly as the wideband precoder used for receiving the multi-port RS.

In a specific example, BS communicating component 442 can transmit the multi-port CSI-RS using a wideband digital precoder that is (or is based on) an identity matrix (e.g., $F_{BBW}=I$) and can transmit the downlink channel using a wideband digital precoder that is not (or is not based on) the identity matrix (e.g., $F_{BBW} \neq I$). In this example, UE communicating component 342 can receive and/or process the multi-port CSI-RS using a wideband digital precoder that is (or is based on) an identity matrix (e.g., $W_{BBW}=I$) and can receive the downlink channel using a wideband digital precoder that is not (or is not based on) the identity matrix (e.g., $W_{BBW} \neq I$). In another specific example, BS communicating component 442 can transmit the multi-port CSI-RS using a wideband digital precoder that is not (or is not based on) an identity matrix (e.g., $F_{BBW} \neq I$) and can transmit the downlink channel using a wideband digital precoder that is (or is based on) the identity matrix (e.g., $F_{BBW}=I$). In this example, UE communicating component 342 can receive and/or process the multi-port CSI-RS using a wideband digital precoder that is not (or is not based on) an identity matrix (e.g., $W_{BBW} \neq I$) and can receive the downlink channel using a wideband digital precoder that is (or is based on) the identity matrix (e.g., $W_{BBW}=I$).

For example, where the transmitting node is a UE transmitting a multi-port CSI-RS with no restriction on wideband digital precoding (e.g., $W_{BBW}=I$), the analog precoder may be determined by the UE, which may be based on a reference analog precoder codebook dictionary configured at the UE, which may be received in a configuration from the network node. In an example, as described further herein, the network node can configure the codebook for the UE. For example, the codebook may include an oversampled discrete Fourier transform (DFT) codebook with parameters $N_1$-$N_2$, which may be associated with azimuth and elevation dimension, and oversampling factors $O_1$-$O_2$, which may be as defined in 3GPP technical specification (TS) 38.214, e.g., in Table 5.2.2.2.1-2. In this example, precoder determining component 354 can indicate the analog precoder in terms of the indices in the oversampled DFT codebook ($s_1$, $s_2$), where $s_i \in 0, 1, 2, \ldots, N_i O_i$. In another example, the codebook may be preconfigured (e.g., site-specific, vendor-specific, carrier-specific, network/UE node capability specific) and exchanged between nodes during initial signaling. In an example, instead of the exact values (e.g., complex entries of the codebook) some quantized values may be specified in the codebook or as a representation of the codebook, so that proprietary advantage is retained. In this example, precoder determining component 354 of the UE can indicate the analog precoder in terms of the indices of the codebook that may include quantized values. The network node receiving the RS and indication of the analog precoder can know how to translate the quantized values into the actual precoder.

In the above examples, the indication can point to an index in the codebook dictionary. For example, method 800 can optionally include, at Block 814, receiving, for the receiving node, a list of analog precoders, or a list of quantized values corresponding to analog precoders, that may be used for transmitting RSs. In an aspect, precoder determining component 354 of a UE as transmitting node, e.g., in conjunction with processor(s) 312, memory/memories 316, transceiver 302, UE communicating component 342, etc. can receive, for the receiving node, the list of analog precoders, or the list of quantized values corresponding to analog precoders, that may be used for transmitting RSs. As described, for example, precoder determining component 354 can receive the list using RRC signaling, as a pre-configuration during initial signaling, etc. In this example, precoder determining component 354 can then indicate the analog precoder as an index into the configured list of precoders or quantized values.

In another example, method 900 can optionally include, at Block 914, transmitting, to the transmitting node, a list of analog precoders, or a list of quantized values corresponding to analog precoders, that may be used for transmitting RSs. In an aspect, precoder determining component 354 of a network node as receiving node, e.g., in conjunction with processor(s) 412, memory/memories 416, transceiver 402, BS communicating component 442, etc., can transmit, to the transmitting node (e.g., UE), the list of analog precoders, or the list of quantized values corresponding to analog precoders, that the UE may use for transmitting RSs. In this example, precoder determining component 354 can receive the indication of the analog precoder as an index into the list of analog precoders or quantized values, and can determine the analog precoder as the precoder indicated by the configuration at the index. In any case, for example, BS communicating component 442 can process the RS and/or related signals based on the SRS computed based on the indicated analog precoder.

In one example, this functionality for UE may be corresponding to a multi-panel UE transmission capability, and the network node can use the SRS and/or indicated analog precoder for uplink measurement to later decide downlink multi-beam MIMO operation assuming channel reciprocity. Thus, in one example, method 800 can optionally include, at Block 816, transmitting, to the receiving node, capability information indicating joint beam capability for transmitting multi-port RS. In an aspect, UE communicating component 342 of a UE as transmitting node, e.g., in conjunction with processor(s) 312, memory/memories 316, transceiver 302, etc., can transmit, to the receiving node (e.g., network node), capability information indicating joint beam capability for transmitting multi-port RS. For example, UE communicating component 342 can transmit the capability information to the network node using semi-static signaling, such as RRC signaling, dynamic signaling, such as MAC-CE, DCI, etc., and/or the like.

In an example, method 900 can optionally include, at Block 916, receiving, from the transmitting node, capability information indicating joint beam capability for transmitting multi-port RS. In an aspect, BS communicating component 442 of a network node as receiving node, e.g., in conjunction with processor(s) 412, memory/memories 416, transceiver

402, etc., can receive, from the transmitting node (e.g., UE), capability information indicating joint beam capability for transmitting multi-port RS. For example, BS communicating component 442 can receive the capability information from the UE in semi-static signaling, such as RRC signaling, dynamic signaling, such as MAC-CE, DCI, etc., and/or the like. In any case, for example, BS communicating component 442 can configure the UE to transmit multi-beam or multi-port SRS using a beam pattern (e.g., based on a default or configured dictionary), and UE can accordingly transmit the multi-port SRS and indication of the analog precoder used to transmit the multi-port SRS.

In addition, for example, the UE 104 can indicate the $W_{BBW}$ index used for the multi-port SRS transmission using the beam pattern, as requested by the network node. The set of codeword choices to indicate the selected $W_{BBW}$ may be configured to the UE 104 (e.g., by the network node) or may be based on the capability information transmitted by the UE (e.g., at Block 816). As described, with reference to Block 810, the UE, as transmitting node, can transmit, for the receiving node (e.g., network node) an indication of the wideband precoder used for transmitting the multi-port RS. Similarly, as described, with reference to Block 910, the network node, as receiving node, can receive, from the transmitting node (e.g., UE), an indication of the wideband precoder used for transmitting the multi-port RS.

In another example, when the network node specifies multi-beam SRS transmission from the UE using an indicated beam pattern, the network node may expect the UE to use $W_{BBW}$ based on the indicted beam pattern $$\left(\text{e.g., } W_{BBW} = (W_{RF}^{*} W_{RF})^{-1/2}\right.$$

This may be up to UE capability and such a restriction may be indicated during capability information exchange described above. Thus, in one example, method 800 can optionally include, at Block 818, receiving, from the receiving node, an indication of a beam pattern to use for transmitting the multi-port RS. In an aspect, UE communicating component 342 of a UE as transmitting node, e.g., in conjunction with processor(s) 312, memory/memories 316, transceiver 302, etc., can receive, from the receiving node (e.g., network node), the indication of the beam pattern to use for transmitting the multi-port RS. For example, UE communicating component 342 can receive the indication of the beam pattern in semi-static signaling, such as RRC signaling, dynamic signaling, such as MAC-CE, DCI, etc., and/or the like. In an example, precoder determining component 354 of the UE as transmitting node can determine the wideband precoder $W_{BBW}$ based on the indicted beam pattern $$\left(\text{e.g., } W_{BBW} = (W_{RF}^{*} W_{RF})^{-1/2}\right).$$

as described, and RS communicating component 352 of the UE can transmit the multi-port SRS based on the beam pattern.

In an example, method 900 can optionally include, at Block 918, transmitting, to the transmitting node, an indication of a beam pattern to use for transmitting the multi-port RS. In an aspect, BS communicating component 442 of a network node as receiving node, e.g., in conjunction with processor(s) 412, memory/memories 416, transceiver 402, etc., can transmit, to the transmitting node (e.g., UE), the indication of the beam pattern to use for transmitting the multi-port RS. For example, BS communicating component 442 can transmit the beam pattern using semi-static signaling, such as RRC signaling, dynamic signaling, such as MAC-CE, DCI, etc., and/or the like.

Figure 10:
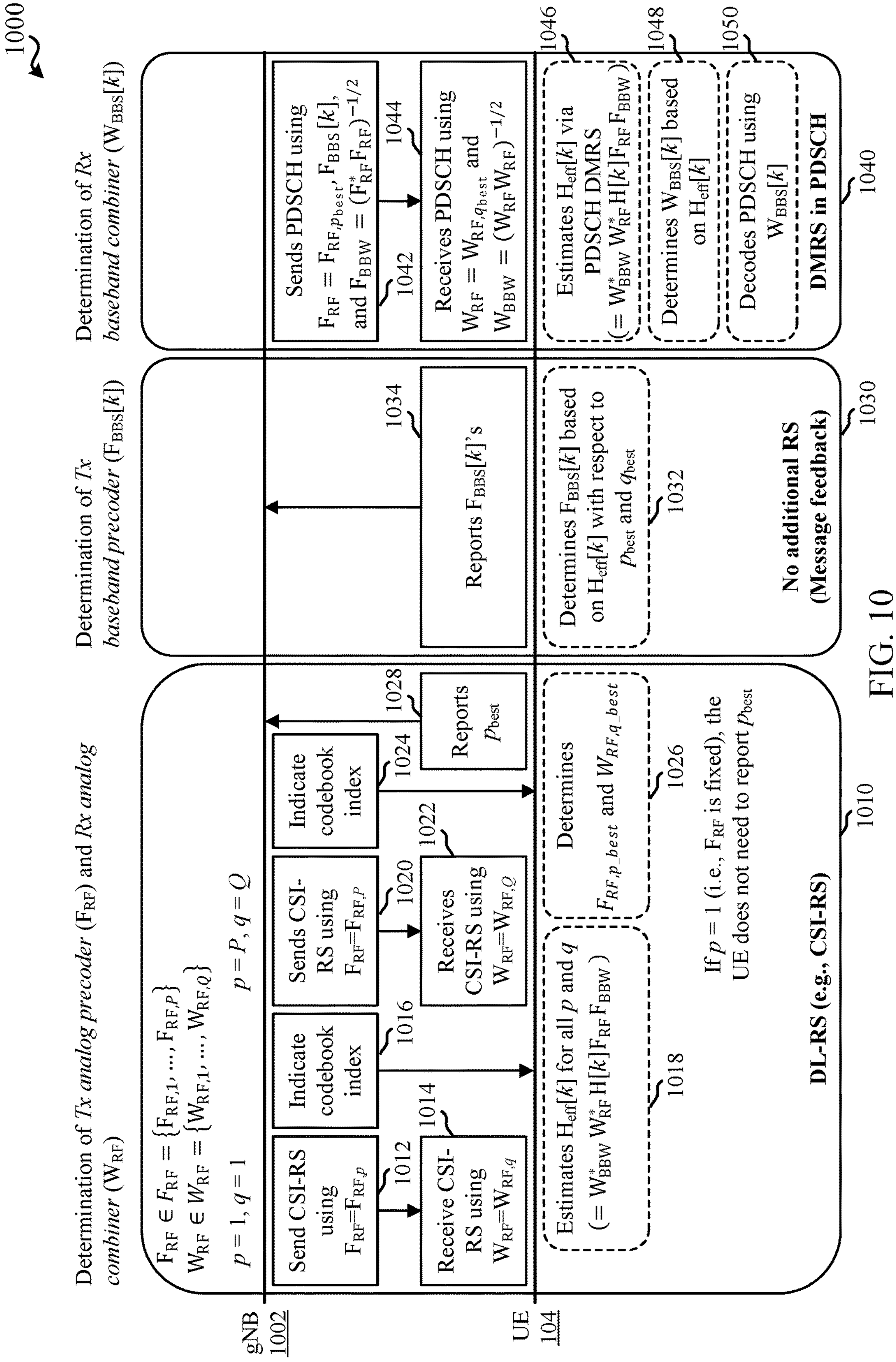
FIG. 10 illustrates an example of a communication timeline for transmitting or receiving a multi-port RS with no restriction on wideband precoder.

FIG. 10 illustrates an example of a communication timeline 1000 for transmitting or receiving a multi-port RS with no restriction on wideband precoder, in accordance with aspects described herein. In communication timeline 1000, gNB 1002 (e.g., a network node, as described herein) can transmit a multi-port CSI-RS to a UE 104. At 1010, a transmit analog precoder (e.g., $F_{RF}$) and a receive analog precoder (or combiner) (e.g., $W_{RF}$) can be determined. For example, gNB 1002 can send a multi-port CSI-RS with no restriction on wideband precoding using $F_{RF}=F_{RF,p}$ at 1012, and UE 104 can receive the CSI-RS using $W_{RF}=W_{RF,q}$ at 1014. At 1016, gNB 1002 can indicate a codebook index for the analog precoder. As described in various examples herein, gNB 1002 can more generally transmit an indication of an analog precoder used in transmitting the CSI-RS at 1012, which can include transmitting a codebook index that corresponds to the analog precoder from a list or codebook or dictionary that defines or otherwise points to multiple analog precoders. In any case, UE 104 can determine the analog precoder used based on the indication from the gNB 1002. At 1018, the UE 104 can estimate the effective channel $H_{eff}[k]$ for all p and q. In addition, gNB 1002 can send a multi-port CSI-RS with no restriction on wideband precoding using $F_{RF}=F_{RF,P}$ at 1020, and UE 104 can receive the CSI-RS using $W_{RF}=W_{RF,Q}$ at 1022. At 1024, gNB 1002 can indicate a codebook index for the analog precoder. At 1026, the UE 104 can determine the best $F_{RF,p\_best}$ and $W_{RF,q\_best}$, and can report at least the best $F_{RF,p\_best}$ back to the gNB 1002 at 1028. For example, the UE 104 can report the best $F_{RF,p\_best}$ in UCI or other uplink signaling.

At 1030, the UE 104 can also determine the subband digital precoder $F_{BBS}[k]$ used by the gNB 1002. For example, at 1032, the UE can determine $F_{BBs}[k]$ based on the effective channel $H_{eff}[k]$ with respect to the best p and q. The UE 104 can report $F_{BBS}[k]$ to the gNB 1002 at 1034. At 1040, the wideband digital precoder (or combiner) at the receiver can be determined. At 1042, gNB 1002 can send PDSCH using the best $F_{RF,P}$, the determined subband digital precoder $F_{BBS}[k]$, and wideband digital precoder $$F_{BBW}=(F_{RF}^{*}F_{RF})^{-1/2}.$$

At 1044, the UE 104 can receive the PDSCH using the best $W_{RF,q}$, and wideband digital precoder $$W_{BBW}=(W_{RF}^{*}W_{RF})^{-1/2}.$$

At 1046, the UE 104 can estimate the effective channel $H_{eff}[k]$ via the PDSCH DMRS, and at 1048 can determine the subband digital precoder $W_{BBS}[k]$ based on the effective channel. At 1050, the UE can decode PDSCH using the subband digital precoder $W_{BBS}[k]$.

As previously explained, in present wireless communication technologies, joint beams and/or corresponding antenna ports may be up to implementation for beam management usage and the exact combination of antenna panels, beams, or antenna ports, as well as the combining weights, are not indicated to the other node. For example, a CSI-RS resource may be configured with multiple antenna panels, ports, and/or beams and the exact precoder choice for CSI-RS transmission may be transparent to the UE. Similarly, for SRS configured with beam management usage, the actual beamforming pattern, precoder weights, etc. can be up to UE implementation. In either case, the receiving node can measure the transmitted RS and indicate the preferred antenna port, beam, resource, etc., usually using single metric (e.g., RSRP or signal-to-interference-and-noise ratio (SINR) averaged over the indicated ports), and without the knowledge of the ports involved or the actual precoder choice. Aspects described herein provide a non-transparent scheme where the precoder choice can be captured and/or indicated to the receiving node, which can then be used to: 1) select a combination of antenna ports and/or beams in a more efficient manner (e.g., for giving better link performance); and/or 2) report enhanced metrics other than average performance while not restricting any precoder choice for the actual transmission of the RS.

Figure 11:
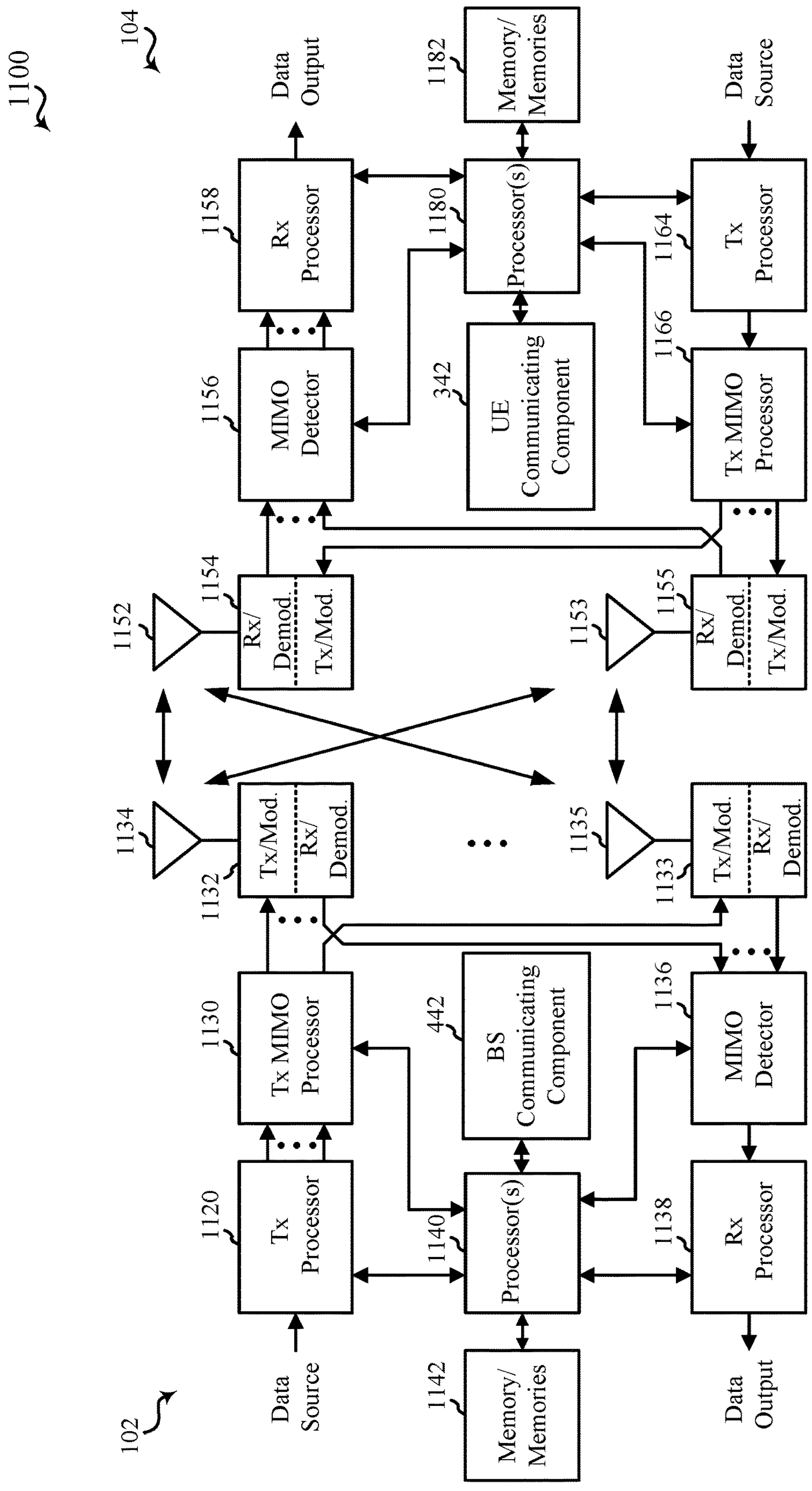
FIG. 11 is a block diagram illustrating an example of a MIMO communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 3. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor(s) 1180, or memory/memories 1182.

The processor(s) 1180 may in some cases execute stored instructions to instantiate a UE communicating component 342 (see e.g., FIGS. 1 and 3).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for single carrier-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor(s) 1140 or memory/memories 1142.

The processor(s) 1140 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communication including transmitting, for a receiving node, a multi-port RS with no restriction on wideband digital precoding, and transmitting, for the receiving node, an indication of an analog precoder used for transmitting the multi-port RS.

In Aspect 2, the method of Aspect 1 includes transmitting, for the receiving node, a list of analog precoders that may be used for transmitting RSs, where the indication includes an index of the analog precoder within the list of analog precoders.

In Aspect 3, the method of Aspect 2 includes where the list of analog precoders includes an oversampled DFT codebook indicating, for each analog precoder in the list of analog precoders, a first parameter indicating an azimuth or elevation dimension and a second parameter indicating an oversampling factor.

In Aspect 4, the method of Aspect 3 includes where the index indicates a combination of the first parameter and the second parameter specified in the oversampled DFT codebook.

In Aspect 5, the method of any of Aspects 1 to 4 includes transmitting, for the receiving node, a list of quantized values corresponding to analog precoders that may be used for transmitting RSs, where the indication includes an index of the analog precoder within the list of quantized values.

In Aspect 6, the method of any of Aspects 1 to 5 includes receiving, from the receiving node, CSI feedback computed based on the multi-port RS and the analog precoder.

In Aspect 7, the method of any of Aspects 1 to 6 includes transmitting, for the receiving node, an indication of a wideband digital precoder used for transmitting the multi-port RS or a corresponding downlink channel, where the wideband digital precoder is not an identity matrix.

In Aspect 8, the method of Aspect 7 includes transmitting the corresponding downlink channel using one of a wideband digital precoder that is an identity matrix or a wideband digital precoder that is not an identity matrix, where transmitting the multi-port RS is using the other one of the wideband digital precoder that is the identity matrix or the wideband digital precoder that is not the identity matrix.

In Aspect 9, the method of any of Aspects 1 to 8 includes receiving, from the receiving node, a list of analog precoders that may be used by the transmitting node for transmitting RSs, where the indication includes an index of the analog precoder within the list of analog precoders.

In Aspect 10, the method of Aspect 9 includes where the list of analog precoders includes an oversampled DFT codebook indicating, for each analog precoder in the list of analog precoders, a first parameter indicating an azimuth or elevation dimension and a second parameter indicating an oversampling factor.

In Aspect 11, the method of Aspect 10 includes where the index indicates a combination of the first parameter and the second parameter specified in the oversampled DFT codebook.

In Aspect 12, the method of any of Aspects 1 to 11 includes receiving, from the receiving node, a list of quantized values corresponding to analog precoders that may be used for transmitting RSs, where the indication includes an index of the analog precoder within the list of quantized values.

In Aspect 13, the method of any of Aspects 1 to 12 includes transmitting, to the receiving node, an indication of a wideband digital precoder used for transmitting the multi-port RS.

In Aspect 14, the method of Aspect 13 includes transmitting, to the receiving node, capability information indicating joint beam capability for transmitting multi-port RS.

In Aspect 15, the method of any of Aspects 1 to 14 includes receiving, from the receiving node, an indication of a wideband digital precoder to use for transmitting the multi-port RS.

In Aspect 16, the method of any of Aspects 1 to 15 includes transmitting a list of analog precoders in RRC signaling.

In Aspect 17, the method of Aspect 16 includes where the RRC signaling also indicates, for each of multiple analog precoders in the list of analog precoders, SSB resources that are quasi-colocated with the multi-port RS.

In Aspect 18, the method of any of Aspects 16 or 17 includes where receiving the indication includes receiving an index of the analog precoder in the list of analog precoders in DCI.

In Aspect 19, the method of Aspect 18 includes where the indication is for a resource identifier corresponding to transmitting the multi-port RS.

In Aspect 20, the method of any of Aspects 16 to 19 includes where the RRC signaling preconfigures the analog precoder in the list of analog precoders.

Aspect 21 is a method for wireless communication including receiving, from a transmitting node, a multi-port RS with no restriction on wideband digital precoding, and receiving, from the transmitting node, an indication of an analog precoder used for transmitting the multi-port RS.

In Aspect 22, the method of Aspect 21 includes receiving, from the transmitting node, a list of analog precoders that may be used for transmitting RSs, where the indication includes an index of the analog precoder within the list of analog precoders.

In Aspect 23, the method of Aspect 22 includes where the list of analog precoders includes an oversampled DFT codebook indicating, for each analog precoder in the list of analog precoders, a first parameter indicating an azimuth or elevation dimension and a second parameter indicating an oversampling factor.

In Aspect 24, the method of Aspect 23 includes where the index indicates a combination of the first parameter and the second parameter specified in the oversampled DFT codebook.

In Aspect 25, the method of any of Aspects 21 to 24 includes receiving, from the transmitting node, a list of quantized values corresponding to analog precoders that may be used for transmitting RSs, where the indication includes an index of the analog precoder within the list of quantized values.

In Aspect 26, the method of any of Aspects 21 to 25 includes transmitting, for the transmitting node, CSI feedback computed based on the multi-port RS and the analog precoder.

In Aspect 27, the method of any of Aspects 21 to 26 includes receiving, from the transmitting node, an indication of a wideband digital precoder used for transmitting the multi-port RS or a corresponding downlink channel, where the wideband digital precoder is not an identity matrix.

In Aspect 28, the method of Aspect 27 includes receiving the corresponding downlink channel using one of a wideband digital precoder that is an identity matrix or a wideband digital precoder that is not an identity matrix, where receiving the multi-port RS is using the other one of the wideband digital precoder that is the identity matrix or the wideband digital precoder that is not the identity matrix.

In Aspect 29, the method of any of Aspects 21 to 28 includes transmitting, for the transmitting node, a list of analog precoders that may be used by the transmitting node for transmitting RSs, where the indication includes an index of the analog precoder within the list of analog precoders.

In Aspect 30, the method of Aspect 29 includes where the list of analog precoders includes an oversampled DFT codebook indicating, for each analog precoder in the list of analog precoders, a first parameter indicating an azimuth or elevation dimension and a second parameter indicating an oversampling factor.

In Aspect 31, the method of Aspect 30 includes where the index indicates a combination of the first parameter and the second parameter specified in the oversampled DFT codebook.

In Aspect 32, the method of any of Aspects 21 to 31 includes transmitting, for the transmitting node, a list of quantized values corresponding to analog precoders that may be used for transmitting RSs, where the indication includes an index of the analog precoder within the list of quantized values.

In Aspect 33, the method of any of Aspects 21 to 32 includes receiving, from the transmitting node, an indication of a wideband digital precoder used for transmitting the multi-port RS.

In Aspect 34, the method of Aspect 33 includes receiving, from the transmitting node, capability information indicating joint beam capability for transmitting multi-port RS.

In Aspect 35, the method of any of Aspects 21 to 34 includes transmitting, for the transmitting node, an indication of a wideband digital precoder to use for transmitting the multi-port RS.

In Aspect 36, the method of any of Aspects 21 to 35 includes receiving a list of analog precoders in RRC signaling.

In Aspect 37, the method of Aspect 36 includes where the RRC signaling also indicates, for each of multiple analog precoders in the list of analog precoders, SSB resources that are quasi-colocated with the multi-port RS.

In Aspect 38, the method of any of Aspects 36 or 37 includes receiving the indication includes receiving an index of the analog precoder in the list of analog precoders in DCI.

In Aspect 39, the method of Aspect 38 includes where the indication is for a resource identifier corresponding to transmitting the multi-port RS.

In Aspect 40, the method of any of Aspects 36 to 39 includes where the RRC signaling preconfigures the analog precoder in the list of analog precoders.

Aspect 41 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 40.

Aspect 42 is an apparatus for wireless communication including means for performing any of the methods of Aspects 1 to 40.

Aspect 43 is one or more computer-readable media including code executable by one or more processors for wireless communications, the code including code for performing any of the methods of Aspects 1 to 40.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
transmit, for a receiving node, a multi-port reference signal (RS) with no restriction on wideband digital precoding; and
transmit, for the receiving node, an indication of an analog precoder used for transmitting the multi-port RS.

2. The apparatus of claim 1, wherein the one or more processors are, individually or in combination, configured to execute the instructions to cause the apparatus to transmit, for the receiving node, a list of analog precoders that may be used for transmitting RSs, wherein the indication includes an index of the analog precoder within the list of analog precoders.

3. The apparatus of claim 2, wherein the list of analog precoders includes an oversampled discrete Fourier transform (DFT) codebook indicating, for each analog precoder in the list of analog precoders, a first parameter indicating an azimuth or elevation dimension and a second parameter indicating an oversampling factor.

4. The apparatus of claim 3, wherein the index indicates a combination of the first parameter and the second parameter specified in the oversampled DFT codebook.

5. The apparatus of claim 1, wherein the one or more processors are, individually or in combination, configured to execute the instructions to cause the apparatus to transmit, for the receiving node, a list of quantized values corresponding to analog precoders that may be used for transmitting RSs, wherein the indication includes an index of the analog precoder within the list of quantized values.

6. The apparatus of claim 1, wherein the one or more processors are, individually or in combination, configured to execute the instructions to cause the apparatus to receive, from the receiving node, channel state information (CSI) feedback computed based on the multi-port RS and the analog precoder.

7. The apparatus of claim 1, wherein the one or more processors are, individually or in combination, configured to execute the instructions to cause the apparatus to transmit, for the receiving node, an indication of a wideband digital precoder used for transmitting the multi-port RS or a corresponding downlink channel, wherein the wideband digital precoder is not an identity matrix.

8. The apparatus of claim 7, wherein the one or more processors are, individually or in combination, configured to execute the instructions to cause the apparatus to transmit the corresponding downlink channel using one of a wideband digital precoder that is an identity matrix or a wideband digital precoder that is not an identity matrix, wherein the one or more processors are, individually or in combination, configured to execute the instructions to cause the apparatus to transmit the multi-port RS using the other one of the wideband digital precoder that is the identity matrix or the wideband digital precoder that is not the identity matrix.

9. The apparatus of claim 1, wherein the one or more processors are, individually or in combination, configured to execute the instructions to cause the apparatus to receive, from the receiving node, a list of analog precoders that may be used by the transmitting node for transmitting RSs, wherein the indication includes an index of the analog precoder within the list of analog precoders.

10. The apparatus of claim 9, wherein the list of analog precoders includes an oversampled discrete Fourier transform (DFT) codebook indicating, for each analog precoder in the list of analog precoders, a first parameter indicating an azimuth or elevation dimension and a second parameter indicating an oversampling factor.

11. The apparatus of claim 10, wherein the index indicates a combination of the first parameter and the second parameter specified in the oversampled DFT codebook.

12. The apparatus of claim 1, wherein the one or more processors are, individually or in combination, configured to execute the instructions to cause the apparatus to receive, from the receiving node, a list of quantized values corresponding to analog precoders that may be used for transmitting RSs, wherein the indication includes an index of the analog precoder within the list of quantized values.

13. The apparatus of claim 1, wherein the one or more processors are, individually or in combination, configured to execute the instructions to cause the apparatus to transmit, to the receiving node, an indication of a wideband digital precoder used for transmitting the multi-port RS.

14. The apparatus of claim 13, wherein the one or more processors are, individually or in combination, configured to execute the instructions to cause the apparatus to transmit, to the receiving node, capability information indicating joint beam capability for transmitting multi-port RS.

15. The apparatus of claim 1, wherein the one or more processors are, individually or in combination, configured to execute the instructions to cause the apparatus to receive, from the receiving node, an indication of a wideband digital precoder to use for transmitting the multi-port RS.

16. The apparatus of claim 1, wherein the one or more processors are, individually or in combination, configured to execute the instructions to cause the apparatus to transmit a list of analog precoders in radio resource control (RRC) signaling.

17. The apparatus of claim 16, wherein the RRC signaling also indicates, for each of multiple analog precoders in the list of analog precoders, synchronization signal block (SSB) resources that are quasi-colocated with the multi-port RS.

18. The apparatus of claim 16, wherein the one or more processors are, individually or in combination, configured to execute the instructions to cause the apparatus to receive the indication as an index of the analog precoder in the list of analog precoders in downlink control information (DCI).

19. The apparatus of claim 18, wherein the indication is for a resource identifier corresponding to transmitting the multi-port RS.

20. The apparatus of claim 16, wherein the RRC signaling preconfigures the analog precoder in the list of analog precoders.

21. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

receive, from a transmitting node, a multi-port reference signal (RS) with no restriction on wideband digital precoding; and receive, from the transmitting node, an indication of an analog precoder used for transmitting the multi-port RS.

22. The apparatus of claim 21, wherein the one or more processors are, individually or in combination, configured to execute the instructions to cause the apparatus to receive, from the transmitting node, a list of analog precoders that may be used for transmitting RSs, wherein the indication includes an index of the analog precoder within the list of analog precoders.

23. The apparatus of claim 22, wherein the list of analog precoders includes an oversampled discrete Fourier transform (DFT) codebook indicating, for each analog precoder in the list of analog precoders, a first parameter indicating an azimuth or elevation dimension and a second parameter indicating an oversampling factor.

24. The apparatus of claim 21, wherein the one or more processors are, individually or in combination, configured to execute the instructions to cause the apparatus to receive, from the transmitting node, a list of quantized values corresponding to analog precoders that may be used for transmitting RSs, wherein the indication includes an index of the analog precoder within the list of quantized values.

25. The apparatus of claim 21, wherein the one or more processors are, individually or in combination, configured to execute the instructions to cause the apparatus to transmit, for the transmitting node, channel state information (CSI) feedback computed based on the multi-port RS and the analog precoder.

26. The apparatus of claim 21, further comprising receiving, from the transmitting node, an indication of a wideband digital precoder used for transmitting the multi-port RS or a corresponding downlink channel, wherein the wideband digital precoder is not an identity matrix.

27. A method for wireless communication, comprising:

transmitting, for a receiving node, a multi-port reference signal (RS) with no restriction on wideband digital precoding; and transmitting, for the receiving node, an indication of an analog precoder used for transmitting the multi-port RS.

28. The method of claim 27, further comprising transmitting, for the receiving node, a list of analog precoders that may be used for transmitting RSs, wherein the indication includes an index of the analog precoder within the list of analog precoders.

29. A method for wireless communication, comprising:

receiving, from a transmitting node, a multi-port reference signal (RS) with no restriction on wideband digital precoding; and receiving, from the transmitting node, an indication of an analog precoder used for transmitting the multi-port RS.

30. The method of claim 29, further comprising receiving, from the transmitting node, a list of analog precoders that may be used for transmitting RSs, wherein the indication includes an index of the analog precoder within the list of analog precoders.

* * * * *